United States Patent [19]

Shinohara

[11] Patent Number: 4,887,517
[45] Date of Patent: Dec. 19, 1989

[54] MASTER CYLINDER WITH PISTON RETAINER

[75] Inventor: Takayoshi Shinohara, Ueda, Japan

[73] Assignee: Nissin Kogyo Kabushiki Kaisha, Ueda, Japan

[21] Appl. No.: 148,515

[22] Filed: Jan. 26, 1988

[30] Foreign Application Priority Data

Mar. 6, 1987 [JP] Japan .................................. 62-51374
Mar. 16, 1987 [JP] Japan .................................. 62-60838
Mar. 23, 1987 [JP] Japan .................................. 62-68197

[51] Int. Cl.$^4$ ........................ F16J 15/18; F16J 10/04
[52] U.S. Cl. ....................................... 92/128; 92/168; 92/171.1; 60/533
[58] Field of Search ............. 92/128, 165, 168, 169.1, 92/170, 171; 60/547.1, 533

[56] References Cited

U.S. PATENT DOCUMENTS

| | | | |
|---|---|---|---|
| 2,832,316 | 4/1958 | Ingres | 60/547.1 X |
| 4,162,616 | 7/1979 | Hayashida | 92/171 X |
| 4,227,371 | 10/1980 | Takeuchi | 60/547.1 |
| 4,423,666 | 1/1984 | Ohmi | 92/168 |
| 4,434,619 | 3/1984 | Kobayashi | 60/547.1 |
| 4,522,031 | 6/1985 | Kyita et al. | 92/128 X |
| 4,527,395 | 7/1985 | Gaiser et al. | 92/171 X |

Primary Examiner—Robert E. Garrett
Assistant Examiner—Mark A. Williamson
Attorney, Agent, or Firm—Armstrong, Nikaido, Marmelstein, Kubovcik & Murray

[57] ABSTRACT

A master cylinder comprising a cylinder body having a bore, a plunger in the bore, a bearing secured to the rear end of the cylinder body and slidably supporting the plunger, a sleeve fitted in the cylinder bore adjacent to the bearing and receiving the plunger therein, and stopper means between the sleeve and plunger for defining a retreat limit of the plunger, wherein the cylinder body is connected to a booster shell with a sealing member therebetween, and the rear end of the plunger protrudes into the booster shell for connection to an output rod of the booster, the sealing member having a lip placed in close contact with the outer peripheral surface of the plunger. An annular set screw is threadedly mounted to the rear opening of the cylinder bore to fix the sleeve while surrounding the plunger, so that the lip of the sealing member is received in a tool-engaging recess provided on the set screw. Alternatively, the plunger comprises a front plunger and a rear plunger. In this case, a rear return spring for biasing the rear plunger in a retreating direction is disposed in a rear hydraulic chamber between the front and rear chambers, wherein a forwardly projecting guide shaft is mounted on the rear plunger, the rear return spring being compressed between the rear plunger and a spring retainer tube slidable on the guide shaft. Stopper means is provided between the spring retainer tube and the inner peripheral wall of the rear hydraulic chamber.

9 Claims, 6 Drawing Sheets

MASTER CYLINDER WITH PISTON RETAINER

BACKGROUND OF THE INVENTION

1. FIELD OF THE INVENTION

The present invention relates to an improvement in master cylinders.

2. DESCRIPTION OF THE PRIOR ART

In conventional master cylinders, for example, as disclosed in Japanese Patent Application Laid-open No. 16952/83, a cylindrical stopper member is provided for receiving the rear end face of a plunger which is fitted in the rear end of a bearing or a cylinder body in order to define a retreat limit for the plunger. For this reason, the rear end of the bearing or cylinder body must has a longer rearward extension so as to meet the rear end of the plunger resting in the retreated position. This is an obstacle to a compactness of the cylinder body or the bearing.

Conventional master cylinders also include an annular stopper member fitted in the rear end of a cylinder body for defining a retreat limit for a plunger, the stopper member being arrested at its rear end by a booster shell in order to prevent slip off of the stopper member, for example, as disclosed in Japanese Utility Model Application Laid-open No. 56158/84. With such a construction, when the cylinder body is disassembled from the booster shell for maintenance, the stopper member may immediately fall off from the cylinder body along with the plunger and they may be damaged.

Thereupon, to prevent the falling-off of the stopper member, it may be conceived to threadedly connect the stopper member to the cylinder body. If doing so, at the time of such threaded connection, a rotating force may be transmitted to the plunger to twist or damage a sealing member around the plunger.

SUMMARY OF THE INVENTION

The present invention has been attained with the above circumstances in view, and it is an object of the present invention to provide a master cylinder free from the above disadvantages encountered in prior art apparatuses.

To accomplish the above object, according to the present invention there is provided a master cylinder comprising a cylinder body having a cylinder bore, a plunger inserted in the cylinder bore, a bearing secured to a rear end of the cylinder body to slidably support the plunger, a sleeve fitted in the cylinder bore adjacent to and in front of the bearing, the plunger being slidably received in the sleeve, and stopper means for defining a retreat limit for the plunger, the stopper means being provided between the sleeve and the plunger.

In addition, according to the present invention, there is provided a master cylinder comprising a cylinder body having a cylinder bore, a front plunger inserted in the cylinder bore to define a front hydraulic chamber between the front plunger and a front end wall of the cylinder bore, a rear plunger inserted in the cylinder bore to define a rear hydraulic chamber between the rear and front plungers, a front return spring for biasing the front plunger in a retreating direction, and a rear return spring for biasing the rear plunger in a retreating direction, wherein a guide shaft having an enlarged head and projecting forwardly from the rear plunger is mounted on the rear plunger, the rear return spring being mounted in compression between the rear plunger and a spring retainer tube slidable on the guide shaft and abuttable against the enlarged head, and a radially outwardly projecting piece is formed on the spring retainer tube, and wherein an inner peripheral wall of the rear hydraulic chamber is formed with an axial guide groove slidably engaged by the projecting piece and a stopper wall adapted to receive the projecting piece to define a retreat limit therefor.

Further, according to the present invention, there is provided a master cylinder comprising a cylinder body having a cylinder bore and connected to a booster shell of a vacuum booster with a sealing member interposed therebetween, a sleeve fitted in the cylinder bore, a plunger slidably received on an inner peripheral surface of the sleeve, stopper means provided between the plunger and the sleeve to define a retreat limit for the plunger, and an annular set screw threadedly mounted to a rear opening of the cylinder bore in a manner to surround the plunger and fix the sleeve, wherein a rear end of the plunger is protruded into the booster shell and is connected to an output rod of the vacuum booster, and the sealing member has a lip placed in close contact with an outer peripheral surface of the plunger and received in a tool-engaging recess provided in a rear end of the set screw.

Since the plunger is slidably received in the sleeve which is fitted in the cylinder bore adjacent to and in front of the bearing, and the stopper means is provided between the sleeve and the plunger as described above, it is possible to shorten the axial length of the cylinder body and the bearing so as to expose the rear end of the plunger to the outside. This largely contributes to a compactness of these components.

In addition, since the guide shaft having an enlarged head is mounted on the rear plunger to project forwardly from the rear plunger, the rear return spring being mounted in compression between the rear plunger and a spring retainer tube slidable on the guide shaft and abuttable against the enlarged head, and the radially outwardly projecting piece is formed on the spring retainer tube, and further since the inner peripheral wall of the rear hydraulic chamber is formed with the axial guide groove slidably engaged by the projecting piece and the stopper wall adapted to receive the projecting piece to define a retreat limit therefor, the spring retainer tube for supporting the front end of the rear return spring can be effectively utilized to restrict retreating motion of the front and rear plungers within the rear hydraulic chamber. This makes it possible to shorten the length of the cylinder body so as to expose the rear end of the rear plunger to the outside, while providing a simplification of the arrangement. Moreover, even if the set load of the rear return spring is set at any level, a deviation cannot be produced in the retreat limit for each plunger. Therefore, it is possible to provide master cylinders of various types by varying the output characteristics of the front and rear hydraulic chambers by changing the set loads of the return springs.

Further, since the annular set screw surrounding the plunger is threadedly mounted to the rear opening of the cylinder bore to fix the sleeve, and the lip of the sealing member is received in the tool-engaging recess provided at the rear end of the set screw, the falling-off of the sleeve, the plunger and the like from the cylinder body can be prevented even if the cylinder body is separated from the booster shell. In addition, in attaching and detaching the set screw, a rotational force is not exerted on the plunger and thus, the sealing member around the plunger can be prevented from being twisted and damaged. Further, in cooperation of the foregoing merits, the feature that the tool-engaging recess in the set screw serves as a lip-receiving recess, enables the entire length of the master cylinder to be further shortened, leading to a compactness of the master cylinder.

The above and other objects, features and advantages of the invention will become apparent from reading of the following description of the preferred embodiments taken in conjunction with the accompanying drawings.

BRIEF DESCRIPTION OF THE DRAWINGS

FIGS. 1 to 3 illustrate a first embodiment of the present invention, wherein

FIGS. 5 to 7 illustrate a third embodiment of the present invention, wherein

DESCRIPTION OF THE PREFERRED EMBODIMENTS

The present invention will now be described by way of several embodiments with reference to the accompanying drawings.

Figure 1:
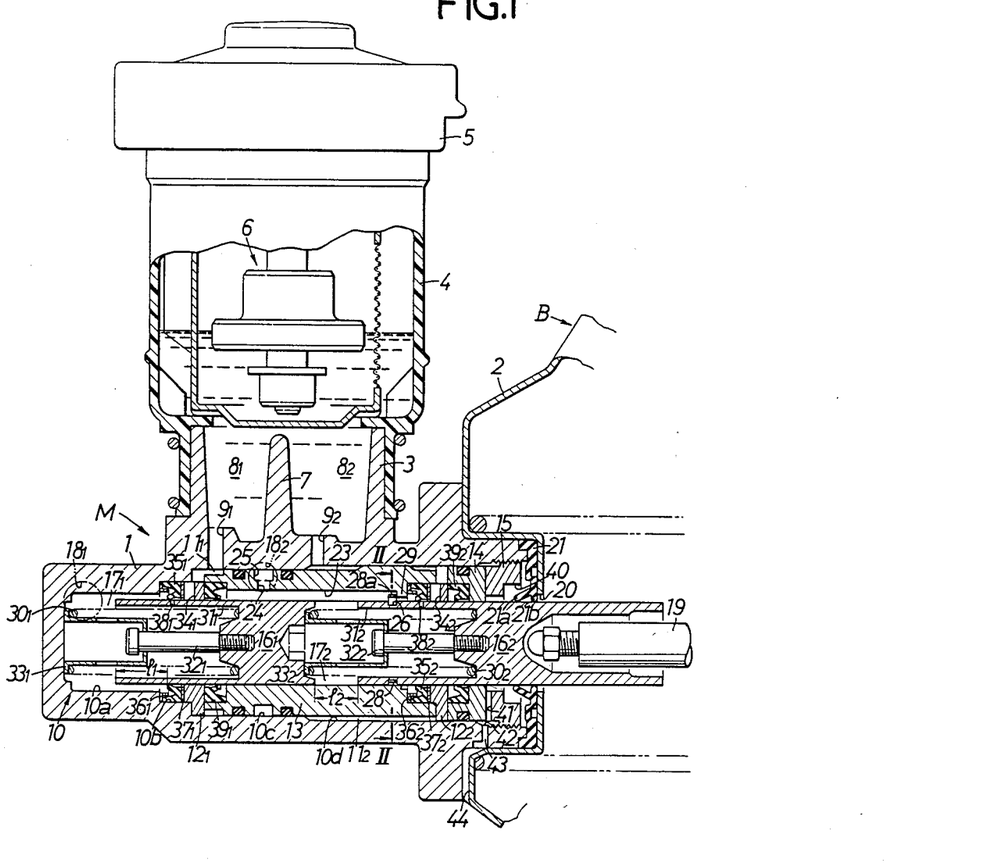
FIG. 1 is a side view in longitudinal section of a master cylinder assembled to a vacuum booster.
Figure 2:
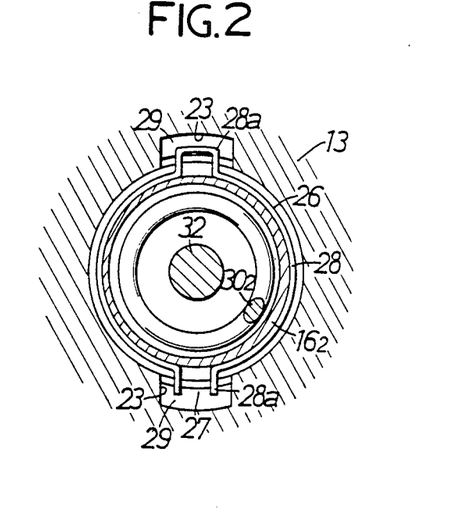
FIG. 2 is a sectional view taken along a line II—II in FIG. 1.
Figure 3:
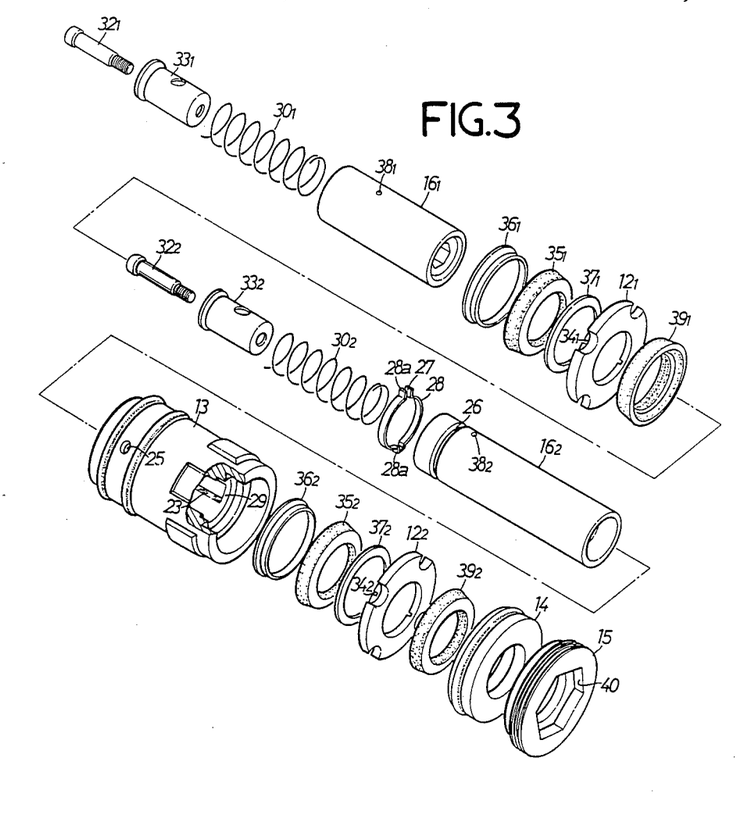
FIG. 3 is an exploded perspective view of details of FIG. 1.

Referring first to FIGS. 1 to 3 showing the first embodiment of the present invention, the reference character M designates a tandem type master cylinder for dual hydraulic brakes of an automobile, and the reference character B denotes a vacuum booster which is operable by a brake pedal not shown. The tandem type master cylinder M has cylinder body 1 which is connected at its rear end to the front wall of a shell 2 of the vacuum booster B by bolt means not shown.

An auxiliary oil reservoir tank 3 is integrally connected to an upper side of the cylinder body 1, and a main oil reservoir tank 4 is connected to the auxiliary oil reservoir tank 3. The main oil reservoir tank 4 has a cap at an upper end thereof and includes a known oil level senser 6 provided therein and supported on the cap 5.

The interior of the auxiliary oil reservoir tank 3 is divided by a partition wall 7 into first and second oil reservoirs $8_1$ and $8_2$ which are supplemented with working oil from the main oil reservoir tank 4.

The first and second oil reservoirs $8_1$ and $8_2$ communicate with a cylinder bore 10 in the cylinder body 1 via through holes $9_1$ and $9_2$, respectively. The cylinder bore 10 comprises a first bore 10a closed at its front end, a second bore 10b having a diameter larger than that of the first bore 10a and connected to a rear end of the first bore, a third bore 10c having a diameter larger than that of the second bore 10b and connected to a rear end of the second bore, and a fourth bore 10d having a diameter larger than that of the third bore 10c and connected to a rear end of the third bore. The fourth bore 10d is opened at its rear end. A front partition wall collar $12_1$ is fitted in a stepped portion between the second bore 10b and the third bore 10c, and a sleeve 13 abutting against a rear surface of the collar $12_1$ is fitted in both of the third bore 10c and the fourth bore 10d. A rear partition wall collar $12_2$ abutting against a rear end of the sleeve 13 and a bearing 14 abutting against the rear end of the collar $12_2$ are fitted in the fourth bore 10d. An annular set screw 15 for holding down a rear end of the bearing 14 is threadedly connected to the rear opening of the fourth bore 10d.

A tool-engaging recess 40 having a hexagonal section is defined at a rear end face of the set screw 15, so that the attaching and detaching of the set screw 15 may be performed by use of a tool (not shown) engaged in the recess 40.

A plurality of radial grooves 41 are provided in at least one of abutment surfaces of the bearing 14 and the set screw 15 and lead to the outside through an annular groove 42 in an inner peripheral surface of the fourth bore 10d, a transverse hole 43 made in the cylinder body 1 and connected to a lower portion of the annular groove 42 and a discharge groove 44 provided between lower joint surfaces of the cylinder body 1 and the booster shell 2. Thus, even if working oil within the cylinder body 1 should be leaked through the bearing 14, such leaked oil can be rapidly discharged to the outside through the discharge groove 44 and thus be prevented from entering the booster shell 2.

An outer peripheral surface of the sleeve 13 defines a front annular oil chamber $11_1$ in the third bore 10c and a rear annular oil chamber $11_2$ in the fourth bore 10d, the front oil chamber $11_1$ being connected to the front through hole $9_1$ and the rear oil chamber $11_2$ being connected to the rear through hole $9_2$.

A pair of front and rear plungers $16_1$ and $16_2$ are mounted for sliding movement on the sleeve 13. A front hydraulic chamber $17_1$ is defined between the front plunger $16_1$ and a front end wall face of the first bore 10a, and a rear hydraulic chamber $17_2$ is defined between both of the plungers $16_1$ and $16_2$. The hydraulic chambers $17_1$ and $17_2$ communicate with respective dual hydraulic brake circuits through front and rear output ports $18_1$ and $18_2$ in the cylinder body 1.

The rear end of the rear plunger $16_2$ extends through the rear partition wall collar $12_2$ and the bearing 14 and further extends rearwardly from the cylinder body 1 through the front wall of the booster shell 2 so as to be operatively connected with an output rod 19 of the vacuum booster B.

In order to prevent leakage of a vacuum pressure within the booster shell 2 from a through hole 20 which is made in the booster shell 2 and through which the rear plunger $16_2$ penetrates, a sealing member 21 is clamped between the cylinder body 1 and the booster shell 2 with the lip portion of the member 21 being placed in intimate contact with the outer peripheral surface of the rear plunger $16_2$.

The sealing member 21 includes as said lip portion a pair of front and rear lips 21a and 21b brought into in close contact with the outer peripheral surface of the rear plunger $16_2$, the front lip 21a projecting to a position forwardly of the rear lip 21b and being received in the above-described tool-engaging recess 40 of the set screw 15.

To permit a communication between the rear hydraulic chamber $17_2$ and the rear output port $18_2$, the sleeve 13 is provided with an axial groove 23 extending on the inner peripheral surface thereof, a transverse hole 24, and an annular groove 25 extending on the outer peripheral surface of the sleeve.

A stopper ring 28 having a single cut 27 is mounted in an outer peripheral groove 26 provided on the rear plunger $16_2$ near its front end. The stopper ring 28 includes a single or a plurality of projections 28a protruded outwardly from the outer peripheral surface of the rear plunger $16_2$ and engaged in the axial groove 23 in the sleeve 13 (see FIG. 3). The axial groove 23 is closed at its rear end by a stopper wall 29 integral with the sleeve 13, and a given retreat limit for the rear plunger $16_2$ is defined by abutment of the projection 28a against the stopper wall 29. Therefore, the stopper ring 28 and the stopper wall 29 constitute stopper means in the first embodiment.

A bottomed spring-retaining hole $31_2$ is provided in the front end face of the rear plunger $16_2$ and contains therein a rear return spring $30_2$ for biasing the plunger $16_2$ in a retreating direction. A guide bolt $32_2$ is screwed in the rear plunger $16_2$ to axially project a given length from an end wall of the spring-retaining hole $31_2$, and a hat-shaped spring retainer tube $33_2$ for retaining a front end of the rear return spring $30_2$ is connected to the guide bolt $32_2$ for sliding movement within a given range of stroke.

A radial groove $34_2$ is provided in the rear partition wall collar $12_2$ and connected to the rear annular oil chamber $11_2$, and a rear unidirectional sealing member $35_2$ for permitting a flow of oil from the groove $34_2$ into the axial groove 23 in the sleeve 13 is mounted at the rear end of the sleeve 13 with a lip thereof being in close contact with the outer peripheral surface of the rear plunger $16_2$.

Mounted on the rear end of the sleeve 13 are a retainer $36_2$ for retaining a front end of the rear unidirectional sealing member $35_2$ and a spacer $37_2$ inserted between the rear unidirectional sealing member $35_2$ and the rear partition wall collar $12_2$.

A rear relief port $38_2$ is perforated in the rear plunger $16_2$ and adapted to permit a communication between the radial groove $34_2$ and the spring-retaining hole 31 just behind the rear unidirectional sealing member $35_2$ when the rear plunger $16_2$ is at a predetermined retreat limit.

A sealing member $39_2$ is also mounted on the bearing 14 to have a lip brought into close contact with the outer peripheral surface o the rear plunger $16_2$.

On the other hand, the front end of the front plunger $16_1$ extends through the front partition wall collar $12_1$ to the first bore $10a$, and a bottomed spring-retaining hole $31_1$ is provided in the front end face of the front plunger $16_1$ and receives therein a front return spring $30_1$ for biasing the front plunger $16_1$ in a retreating direction. A guide bolt $32_1$ is screwed in the front plunger $16_1$ to axially project a given length from an end wall of the spring-retaining hole $31_1$, and a hat-shaped spring retainer tube $33_1$ for retaining a front end of the front return spring $30_1$ is slidably fitted over the guide bolt $32_1$.

A predetermined retreat limit for the front plunger $16_1$ is defined by abutment of the rear end of the front plunger $16_1$ against the spring retainer tube $33_2$ which is in its extended position. In this case, the front return spring $30_1$ has a set load set at a value smaller than that of the rear return spring $30_2$ such that the spring retainer tube $33_2$ may be left in a predetermined extended position.

A radial groove $34_1$ is provided in the front partition wall collar $12_1$ and connected to the front annular oil chamber $11_1$, and a front unidirectional sealing member $35_1$ for permitting only a flow of oil from the groove $34_1$ into the front hydraulic chamber $17_1$ is mounted in the second bore $10b$ with a lip thereof being in close contact with the outer peripheral surface of the front plunger $16_1$.

Also mounted in the second bore $10b$ are a retainer $36_1$ for retaining a front end of the front unidirectional sealing member $35_1$ and a spacer $37_1$ inserted between the sealing member $35_1$ and the front partition wall collar $12_1$.

A front relief port $38_1$ is perforated in the front plunger $16_1$ so as to permit a communication between the radial groove $34_1$ and the spring-retaining hole $31_1$ when the front plunger $16_1$ is at a predetermined retreat limit.

A sealing member $39_1$ is mounted at the front end of the sleeve 13 to have a lip brought into close contact with the outer peripheral surface of the front plunger $16_1$.

When the front and rear plungers $16_1$ and $16_2$ now assume their predetermined retreated positions, the following relationship is established:

$$l1 > l2$$

wherein 1 represents a length of that portion of the front plunger $16_1$ which projects forwardly from the front unidirectional sealing member $35_1$, and 2 represents a distance between both of the plungers $16_1$ and $16_2$. In doing so, the front plunger $16_1$ can be prevented from rearwardly slipping out of the front unidirectional sealing member $35_1$, even if it has been abnormally retreated by breakage of the spring $30_2$, for example, until it has abutted against the front end of the rear plunger $16_2$.

The operation of the first embodiment will be described below.

If the vacuum booster B is now operated to advance the output rod 19 thereof, both the plungers $16_1$ and $16_2$ in the master cylinder M are urged by the output, rod 19 to advance while compressing their associated return springs $30_1$ and $30_2$. When the relief port $38_1$ in the front plunger $16_1$ has thus been passed forwardly of the front unidirectional sealing member $35_1$, a hydraulic pressure is developed in the front hydraulic chamber $17_1$ depending upon an advancing force of the front plunger $16_1$. On the other hand, when the relief port $38_2$ in the rear plunger $16_2$ has been passed forwardly of the rear unidirectional sealing member $35_2$, a hydraulic pressure is developed in the rear hydraulic chamber $17_2$ depending upon an advancing force of the rear plunger $16_2$.

The hydraulic pressures developed in the front and rear hydraulic chambers $17_1$ and $17_2$ in this manner are delivered through the corresponding output ports $18_1$ and $18_2$ to simultaneously actuate dual hydraulic brakes for application of braking to an automobile.

If the vacuum booster B is brought back to its inoperative condition to release the braking, the plungers $16_1$ and $16_2$ are moved back to their predetermined retreat limits by resilient forces of the corresponding return springs $30_1$ and $30_2$, respectively. But if the individual hydraulic chambers $17_1$ and $17_2$ are reduced in pressure in the course of such retreating movement, the lips of the corresponding unidirectional sealing members $35_1$ and $35_2$ are deflected toward the hydraulic chambers $17_1$ and $17_2$ due to a difference in pressure thereacross, so that working oil within the first oil reservoir $8_1$ is supplemented into the front hydraulic chamber $17_1$ via the through hole $9_1$, the front annular oil chamber $11_1$, the radial groove $34_1$, and the inside of the lip of the front unidirectional sealing member $35_1$, while working oil within the second oil reservoir $8_2$ is supplemented into the rear hydraulic chamber $17_2$ via the through hole $9_2$, the rear annular oil chamber $11_2$, the radial groove $34_2$, the inside of the lip of the rear unidirectional sealing member $35_2$, and the axial groove 23.

At this time, if the working oil is excessively supplied into each the hydraulic chambers $17_1$ and $17_2$, excessive oil is released through the relief ports $38_1$, $38_2$ to the oil reservoirs $8_1$, $8_2$ when the plungers $16_1$, $16_2$ have been returned to the retreat limit.

Meanwhile, the projection 28a of the stopper ring 28 mounted on the rear plunger $16_2$ is merely moved forwardly within the axial groove 23 of the sleeve 13 during advancing movement of the plunger $16_2$ and cannot obstruct the advancing movement of the plunger $16_2$ in any way. On the other hand, at the time of retreating movement of the plunger $16_2$, the projection 28a abuts against the stopper wall 29 of the sleeve 13 to define the retreat limit for the plunger $16_2$. Because the defining of the retreat limit for the rear plunger $16_2$ is effected within the cylinder bore 10 in this manner, it is possible to shorten the axial lengths of the cylinder body 1 and the bearing 14 so as to expose the rear end portion of the rear plunger $16_2$ to the outside.

Moreover, since the front lip 21a of the sealing member 21 is received in the tool-engaging recess 40 of the set screw 15, it is unnecessary to specially provide an exclusive space for such lip 21a between the cylinder body 1 and the booster shell 2, and this makes it possible to correspondingly shorten the entire length of the assembly made of the master cylinder M and the vacuum booster B.

In addition, even if the cylinder body 1 and the booster shell 2 are disassembled, for example, for maintenance, the sleeve 13 and the front and rear plungers $16_1$ and $16_2$ cannot be removed out of the cylinder bore 10 unless the set screw 15 is removed. Therefore, these components can be prevented from falling off.

Further, when rotating the set screw 15 for detaching, such rotational force is not transmitted to the rear plunger $16_2$ and hence, the sealing member around the rear plunger $16_2$ cannot be twisted or damaged.

Figure 4:
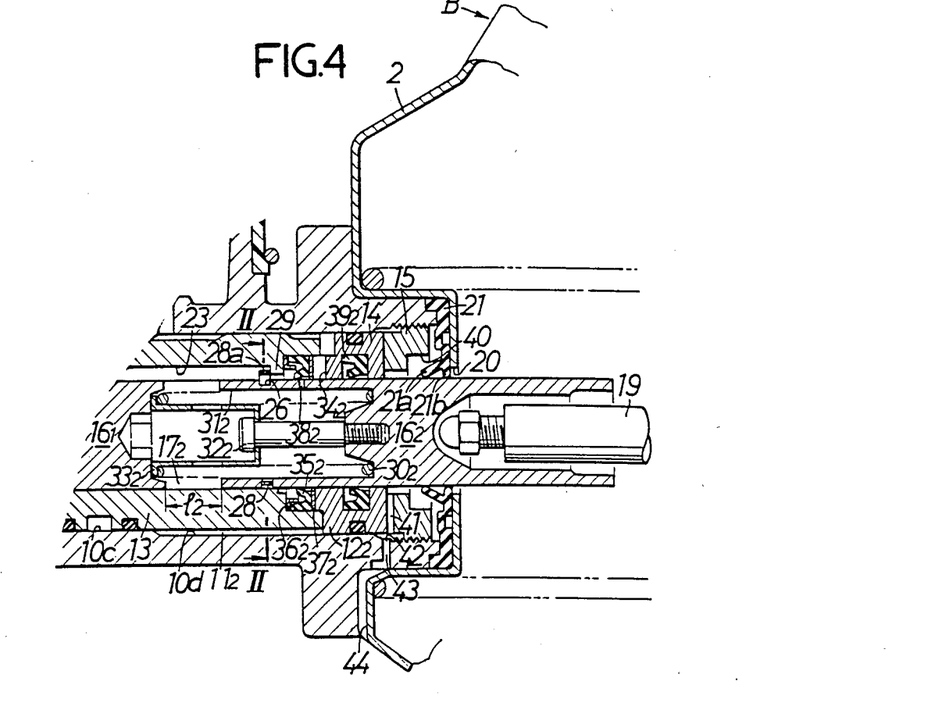
FIG. 4 is a side view in longitudinal section of details of a second embodiment of the present invention.

FIG. 4 illustrates a second embodiment of the present invention, which is of a construction similar to that of the previous embodiment, except that the bearing 14 and the partition wall collar $12_2$ are integrally formed. In this figure, the parts corresponding to those in the first embodiment are designated by the same reference numerals.

Figure 5:
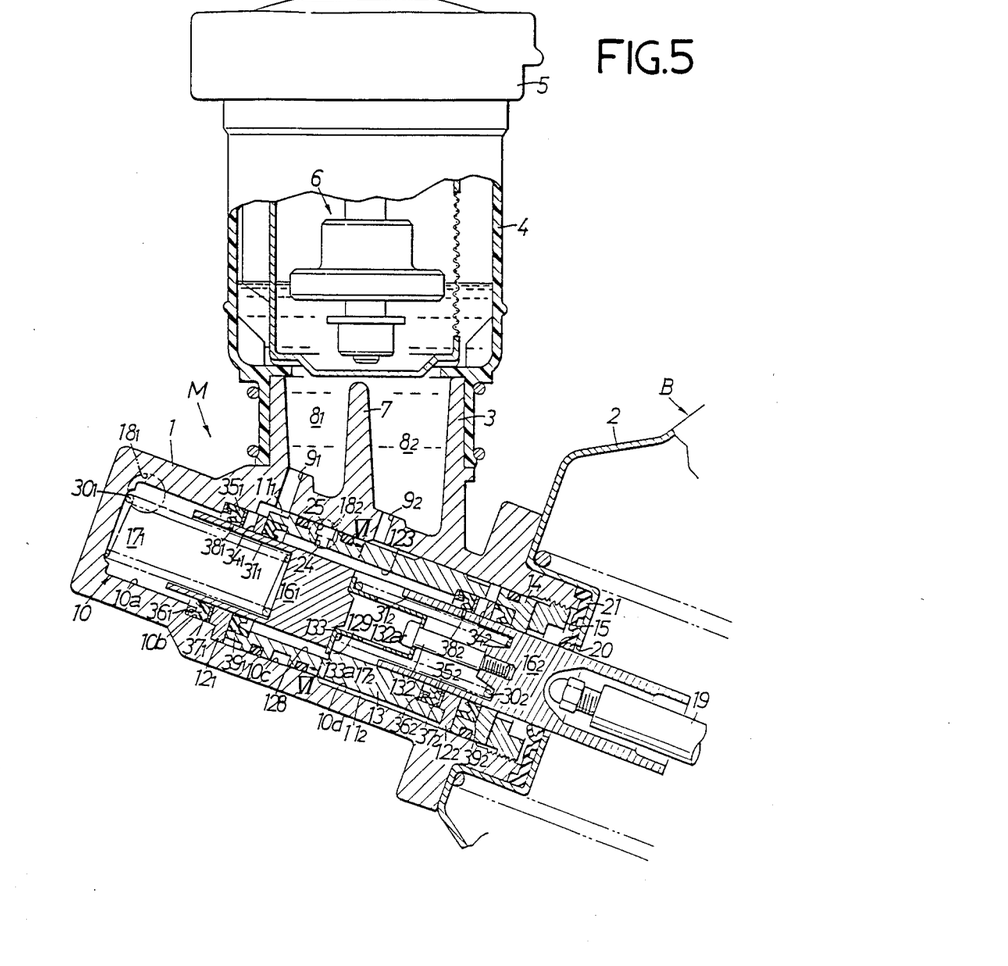
FIG. 5 is a side view in longitudinal section of a master cylinder.
Figure 6:
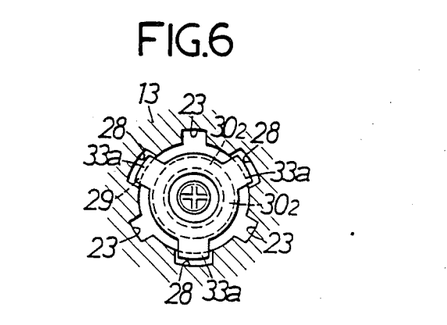
FIG. 6 is a sectional view taken along a line VI—VI in FIG. 5.
Figure 7:
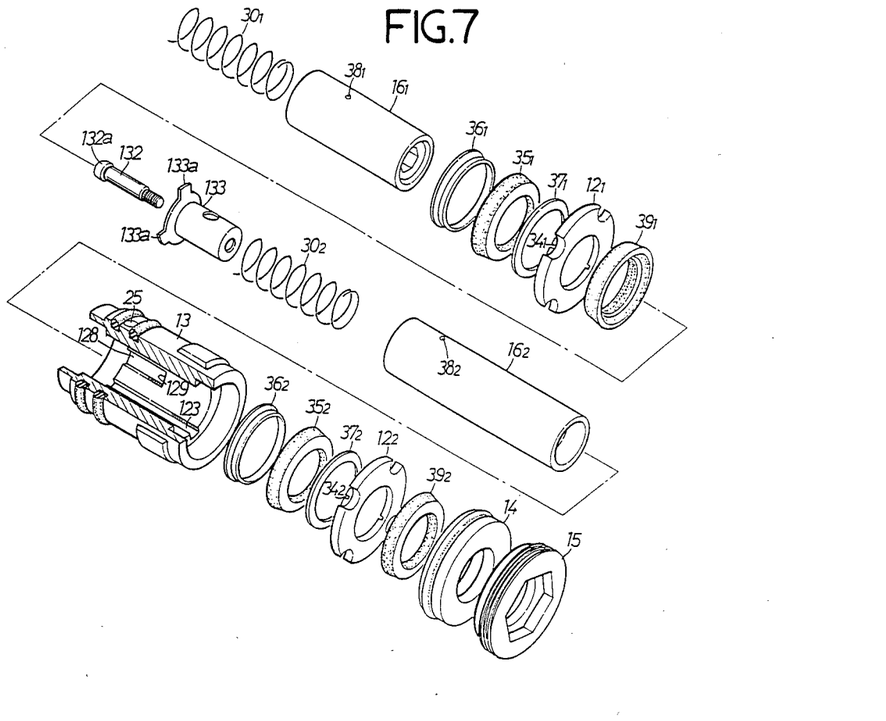
FIG. 7 is an exploded perspective view of details of FIG. 5.

A third embodiment of the present invention will be described below with reference to FIGS. 5 to 7. The third embodiment is different from the previous first and second embodiments in that the cylinder body 1 of the master cylinder M is inclined and further in a stopper arrangement for defining retreat limits for the front and rear plungers $16_1$ and $16_2$. Other arrangements are substantially the same as those in the previous embodiments and therefore, only the different parts will be described below while mainly referring to the stopper arrangement. In the third embodiment, the parts corresponding to those in the first and second embodiments are denoted by the same reference numerals.

A guide shaft 132 axially projecting a given length from the end wall of the spring retaining hole $31_2$ is threadedly inserted in the rear plunger $16_2$ which is slidably received in the sleeve 13. The shaft 132 has its leading end formed as enlarged head 132a. A hat-shaped spring retainer tube 133 is slidably fitted over the guide shaft 132 for supporting the front end of the rear return spring $30_2$, so that abutting of the spring retainer tube 133 against the enlarged head 132a defines a limit of expansion of the rear return spring $30_2$.

A plurality of, three in the illustrated embodiment, radially outwardly projecting pieces 133a are integrally formed on the spring retainer tube 133 at distances circumferentially spaced apart from one another, and corresponding, three in the embodiment, axial guide grooves 128 slidably engaged by the projecting pieces 133a are provided in the inner peripheral wall of the sleeve 13 at distances circumferentially spaced apart from one another so as not to overlap the axial groove 123. The guide grooves 128 start with the front end of the sleeve 13 and terminate in an intermediate portion thereof, with a terminal end thereof being closed by a stopper wall 129 integral with the sleeve 13. A retreat limit for the spring retainer tube 133 is defined by the projecting pieces 133a abutting against the stopper wall 129. The stopper wall 129 and the projecting pieces 133a constitute stopper means in the present embodiment.

The guide groove 128 is shaped to have a cross section sufficiently larger than that of the projecting piece 133a, so that an oil within the guide groove 128 can be passed across the projecting piece 133a with the forward and rearward sliding movement of the projecting piece 133a. In addition, in order to prevent the projecting piece 133a from being inserted into the axial groove 123 by mistake, a cross section of the axial groove 123 is so shaped that the projecting piece 133a cannot be inserted into the axial groove 123.

On the other hand, unlike the previous first and second embodiments, the front plunger $16_1$ slidably fitted in the sleeve 13 is not provided with a guide bolt having a spring retainer tube slidably fitted thereover, and the front end of the return spring $30_1$ directly abuts against the front end wall of the cylinder bore 10.

Description will now be made of the operation of the third embodiment.

Now, if the vacuum booster B is operated so that the output rod 19 thereof is advanced, the plungers $16_1$ and $16_2$ are urged by the output rod 19 to advance within the sleeve 13 while compressing the associated return springs $30_1$ and $30_2$. This causes a hydraulic pressure corresponding to advancing forces of the plungers $16_1$ and $16_2$ to be developed within the front and rear hydraulic chambers $17_1$ and $17_2$ in the same manner as in the first and second embodiments. The hydraulic pressures thus developed in the front and rear hydraulic chambers $17_1$ and $17_2$ are delivered through the corresponding output ports $18_1$ and $18_2$ to simultaneously actuate the dual hydraulic brakes, so that an automobile can be braked.

Then, if the vacuum booster B is brought back to an inoperative condition to release the braking, the plungers $16_1$ and $16_2$ are retreated within the sleeve 13 by resilient forces of the corresponding springs $30_1$ and $30_2$ to be retained at their predetermined retreat limits by engagement of the stopper wall 129 with the projecting pieces 133a.

Since the projecting pieces 133a of the spring retainer tube 133 are in slidable engagement in the axially extending guide grooves 128 of the sleeve 13, the forward and backward movement of the spring retainer tube 133 along with the front plunger 16₁ cannot be interfered with in any way during advancing and retreating movements of the front and rear plungers 16₁ and 16₂ within the sleeve 13.

At the time of retreating movement of the front and rear plungers 16₁ and 16₂, the expansion limit for the rear return spring 30₂ and therefore the distance between both the plungers 16₁ and 16₂ are determined by the spring retainer tube 133 abutting against the enlarged head 132a of the guide shaft 132. At the same time, the projecting pieces 133a are received on the stopper wall 129 of the sleeve 13, and the enlarged head 132a of the guide shaft 132 is received on the spring retainer tube 133, whereby the retreat limit for the rear plunger 16₂ is defined, while the front plunger 16₁ is received at its rear end on the stopper wall 129 through the projecting pieces 133a, whereby the retreat limit for the front plunger 16₁ is defined.

What is claimed is:

1. A master cylinder comprising:
   a cylinder body having a cylinder bore;
   a front plunger inserted in said cylinder bore to define a front hydraulic chamber between said front plunger and a front end wall of said cylinder bore;
   a rear plunger inserted in said cylinder bore to define a rear hydraulic chamber between said rear and front plungers;
   a front return spring for biasing said front plunger in a retreating direction; and
   a rear return spring for biasing said rear plunger in a retreating direction;
   wherein a guide shaft having an enlarged head and projecting forwardly from said rear plunger is mounted on said rear plunger, said rear return spring being mounted in compression between said rear plunger and a spring retainer tube slidable on said guide shaft and abuttable against said enlarged head, and a radially outwardly projecting piece is formed on said spring retainer tube, and wherein an inner peripheral wall of said rear hydraulic chamber is formed with an axial guide groove slidably engaged by said projecting piece and a stopper wall adapted to receive said projecting piece to define a retreat limit therefor.

2. A master cylinder according to claim 1, wherein said stopper wall closes a rear end of said guide groove.

3. A master cylinder according to claim 1 or 2, wherein each of said guide groove and said projecting piece is provided in plurality at distances circumferentially spaced apart from one another.

4. A master cylinder comprising:
   a cylinder body having a cylinder bore and connected to a booster shell of a vacuum booster with a sealing member interposed therebetween;
   a sleeve fitted in said cylinder bore;
   a plunger slidably received on an inner peripheral surface of said sleeve;
   stopper means provided between said plunger and said sleeve to define a retreat limit for said plunger; and
   an annular set screw threadedly mounted to a rear opening of said cylinder bore in a manner to surround the plunger and fix said sleeve, wherein a rear end of said plunger is protruded into the booster shell and is connected to an output rod of said vacuum booster, and said sealing member has a lip placed in close contact with an outer peripheral surface of said plunger and received in a tool-engaging recess provided in a rear end of said set screw.

5. A master cylinder according to claim 4, wherein said tool-engaging recess is shaped to have a section permitting engagement with a tool, so that attaching and detaching of said set screw into and out of said cylinder bore are achieved by use of the tool engaged in said engaging recess.

6. A master cylinder according to claim 4, wherein the lip of said sealing member comprises a pair of front and rear lips which are in close contact with the outer peripheral surface at the rear end of said plunger, said front lip being received in said tool-engaging recess.

7. A master cylinder comprising:
   a cylinder body having a cylinder bore;
   a plunger inserted in said cylinder bore;
   a bearing secured to a rear end of said cylinder body to slidably support said plunger;
   a sleeve fitted in said cylinder bore adjacent to and in front of said bearing, said plunger being slidably received in said sleeve;
   stopper means for defining a retreat limit for said plunger, said stopper means being provided between said sleeve and said plunger, said stopper means comprising a stopper wall integrally formed on said sleeve, a stopper ring mounted over an outer periphery of said plunger and capable of abutting against said stopper wall, and said sleeve being provided with an axial groove extending on an inner peripheral surface thereof, and a rear end of said axial groove being closed by said stopper wall.

8. A master cylinder comprising:
   a cylinder body having a cylinder bore;
   a plunger inserted in said cylinder bore;
   a bearing secured to a rear end of said cylinder body to slidably support said plunger;
   a sleeve fitted in said cylinder bore adjacent to and in front of said bearing, said plunger being slidably received in said sleeve;
   stopper means for defining a retreat limit for said plunger, said stopper means being provided between said sleeve and said plunger, said stopper means comprising a stopper wall integrally formed on said sleeve, a stopper ring mounted over an outer periphery of said plunger and capable of abutting against said stopper wall, and said sleeve being provided with an axial groove extending on an inner peripheral surface thereof, and a rear end of said axial groove being closed by said stopper wall; and
   said plunger being provided with an outer peripheral groove in which said stopper ring is mounted.

9. A master cylinder according to claim 7 or 8, wherein said stopper ring includes at least one projection protruding outwardly from an outer peripheral surface of said plunger, said projection being engaged in said axial groove in said sleeve for axial movement therein.

* * * * *